United States Patent
Itkin

(10) Patent No.: US 8,452,246 B2
(45) Date of Patent: May 28, 2013

(54) ANTENNA TUNER IN COMBINATION WITH MODIFIED FEEDBACK RECEIVER FOR IMPROVED ANTENNA MATCHING

(75) Inventor: Grigory Itkin, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/081,694

(22) Filed: Apr. 7, 2011

(65) Prior Publication Data

US 2012/0258675 A1    Oct. 11, 2012

(51) Int. Cl.
*H04B 1/04*    (2006.01)

(52) U.S. Cl.
USPC .......................................... 455/123; 455/121

(58) Field of Classification Search
USPC .................. 455/120, 121, 122, 123, 124, 125
See application file for complete search history.

(56) References Cited

U.S. PATENT DOCUMENTS

| | | | |
|---|---|---|---|
| 4,965,607 A * | 10/1990 | Wilkins et al. ................ | 343/861 |
| 5,874,921 A | 2/1999 | Doherty et al. | |
| 7,088,967 B2 | 8/2006 | Hildebrand et al. | |
| 7,359,681 B2 | 4/2008 | Cho | |
| 8,131,232 B2 | 3/2012 | Muhammad | |
| 8,170,505 B2 | 5/2012 | Keerti et al. | |
| 8,170,509 B2 | 5/2012 | Norris et al. | |
| 8,311,495 B2 | 11/2012 | Norris et al. | |
| 2002/0123363 A1 | 9/2002 | Hildebrand et al. | |
| 2006/0025088 A1 | 2/2006 | Pietig et al. | |
| 2007/0232249 A1* | 10/2007 | Kwon et al. ................ | 455/121 |
| 2009/0225897 A1* | 9/2009 | Toyota et al. ................ | 375/295 |
| 2009/0253385 A1 | 10/2009 | Dent et al. | |
| 2011/0254751 A1* | 10/2011 | Bengtsson .................... | 343/860 |

FOREIGN PATENT DOCUMENTS

WO    2009124874 A1    10/2009

OTHER PUBLICATIONS

U.S. Appl. No. 13/273,563, filed Oct. 14, 2011.
Office Action dated Mar. 6, 2013 for U.S. Appl. No. 13/273,563.
Qizheng Gu, et al.; "An Analytical Algorithm for Pi-Network Impedance Tuners"; IEEE; 2011; p. 1-12.
U.S. Appl. No. 13/800,39, filed Mar. 13, 2013. 25 Pages.

* cited by examiner

*Primary Examiner* — Blane J Jackson
(74) *Attorney, Agent, or Firm* — Eschweiler & Associates, LLC

(57) ABSTRACT

Some embodiments of the present disclosure relate to techniques for automatically measuring antenna mismatching conditions for a given mobile phone with a given antenna in a given environment and on a given frequency. In particular, some embodiments use a two way directional coupler coupled between a radio frequency (RF) transmitter output (e.g., analog front end) and an antenna tuner. This two-way directional coupler is coupled to a mismatch calculator, which is often implemented as a software algorithm, to accurately tune an antenna tuner to limit impedance mismatch. Consequently, changes in impedance mismatch can be tracked and compensated for so the user will not experience degradations in signal quality, thereby helping reduce the number of dropped calls, for example. Also, because power is tracked and radiated more accurately, these techniques save battery energy relative to conventional solutions and can stay on-line longer with optimum transmitting conditions.

10 Claims, 3 Drawing Sheets

US 8,452,246 B2

ANTENNA TUNER IN COMBINATION WITH MODIFIED FEEDBACK RECEIVER FOR IMPROVED ANTENNA MATCHING

BACKGROUND

Modern communication units, such as many mobile phone hand sets for example, include integrated antennas to transmit and receive radio frequency (RF) signals. Antenna designers strive to make these integrated antennas smaller and smaller, while at the same time covering as many frequency bands as possible. The small size allows the integrated antennas to be used in different types of end-user devices, while the wide operating frequency allows a given end user device to be used for different communication standards.

Unfortunately, these integrated antennas are sensitive to external use cases (described below). This sensitivity to external use cases, combined with the fact that a given antenna can be used over multiple frequency bands, makes it difficult to accurately match the impedance of the antenna to the impedance of the RF circuitry in the transmitter. Illustrative external factors can include whether or not a hand is positioned on the phone (and the particular position of such a hand, if present), whether the phone is close to a user's head, and/or whether any metal objects are close to the antenna, among others. All of these external factors can alter the impedance of the antenna, thereby leading to impedance mismatch between the antenna and RF circuitry within the transmitter. Such impedance mismatch can degrade the power radiated by the phone and increase the phone's sensitivity to noise. From a user's perspective, impedance mismatch can ultimately lead to a reduction in talk time and/or a dropped call.

To provide better matching between RF circuitry in the transmitter and the antenna, handset designers use antenna tuners. Conventionally, handset designers have arranged sensors inside the phone's package to detect the presence or absence of the previously mentioned external factors. Then the detected environment is compared with known use cases (e.g., "free space", "hand on the phone", "close to head", "metal plate" . . . ) and a corresponding predetermined tuner setting is chosen selected based on the detected use case.

Unfortunately, this conventional approach requires a large number of sensors inside the mobile phone, which increases the phone's volume and cost (particularly if there are a large number of possible use cases to be detected). For example, with regards to a "hand on the phone" use case, sensors may be needed to differentiate between "Man's hand . . . ", "Woman's hand . . . ", "Child's hand . . . ", and to further differentiate each of these hand types as having "dry skin . . . ", "normal skin", "sweaty skin", etc. Sensors might also be needed to detect a mobile phone's package and even its color, some of which can be changed via aftermarket accessories and which can affect impedance matching for the antenna. Further, because the tuner settings for each use case are dependant on frequency bands (and even frequency sub bands), the conventional approach requires a detailed analysis of use cases in a dynamic fashion for each new handset design. Having to analyze and store all of these use cases requires a large number of sensors, a significant amount of ROM, and processing power.

Therefore, although conventional antenna matching schemes are sufficient in some regards, they are less than ideal for several reasons. Accordingly, the inventors have devised improved antenna matching schemes as set forth herein.

DETAILED DESCRIPTION

Figure 1:
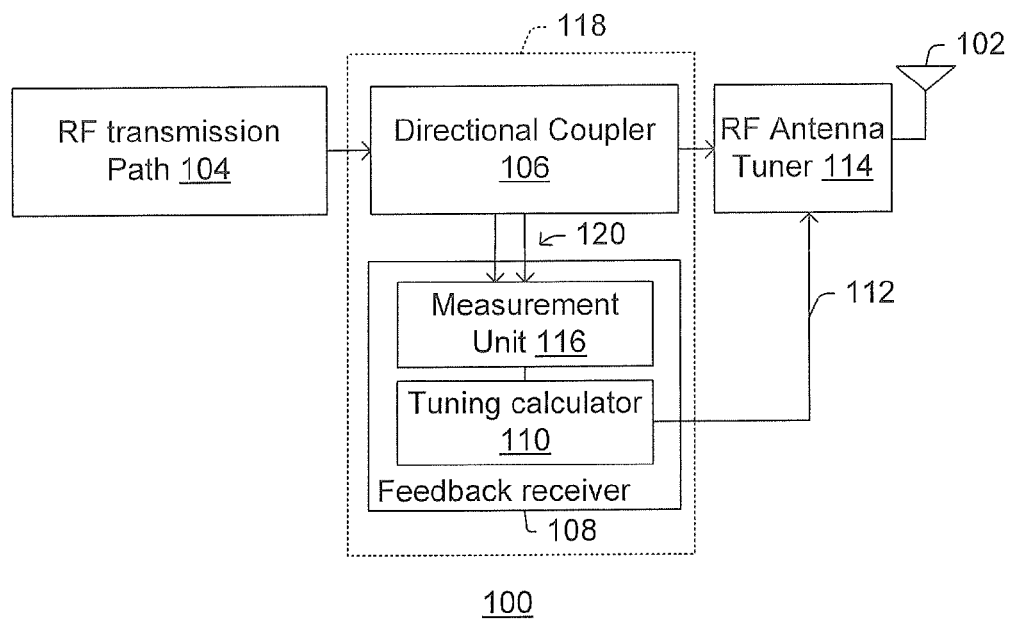
FIG. 1 is a block diagram of a transmitter in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Some embodiments of the present disclosure relate to techniques for automatically measuring antenna mismatching conditions for a given mobile phone with a given antenna in a given environment and on a given frequency. In particular, some embodiments use a two way directional coupler coupled between a radio frequency (RF) transmitter output (e.g., analog front end) and an antenna tuner. This two-way directional coupler is coupled to a mismatch calculator, which is often implemented as a software algorithm, to accurately tune an antenna tuner to limit impedance mismatch. Consequently, changes in impedance mismatch can be tracked and compensated for so the user will not experience degradations in signal quality, thereby helping reduce the number of dropped calls, for example. Also, because power is tracked and radiated more accurately, these techniques save battery energy relative to conventional solutions and can stay on-line longer with optimum transmitting conditions.

FIG. 1 shows a transmitter 100 in accordance with some embodiments. The transmitter 100 includes an RF antenna 102 and a RF transmission path 104 (e.g., analog front end). During operation, the RF transmission path 104 generates an RF signal to be transmitted over the RF antenna 102 while the transmitter is subject to a number of different use cases (e.g., "hand on" phone, "hand off" phone, metal plate close to phone, different transmission frequency bands). As previously discussed, absent countermeasures, these use cases can cause impedance mismatch between the RF antenna 102 and the RF transmission path 104, which can potentially cause power loss and signal degradation.

To limit the impedance mismatch, analysis circuitry 118 includes a directional coupler 106 coupled between the RF transmission path 104 and the RF antenna tuner 114. The directional coupler 106 couples out a small part of the RF signal from the transmission path 104 and splits this small part of the RF signal into two parts on paths 120. A measurement unit 116 can measure forward propagating waves and reflected waves on paths 120. A tuning calculator 110 then analyzes the measured forward propagating and reflected waves and, based on these measured waves, provides a control signal on a feedback path 112 to an RF antenna tuner 114. The RF antenna tuner 114 then changes its impedance in response to the control signal to limit impedance mismatch between the RF antenna 102 and RF transmission path 104 for a given use case. The control signal on feedback path 112 is updated from time to time to reflect changes in use cases and/or frequency, thereby helping to keep the antenna 102 "tuned" to the RF transmission path 104 on a relatively continuous basis.

Figure 2:
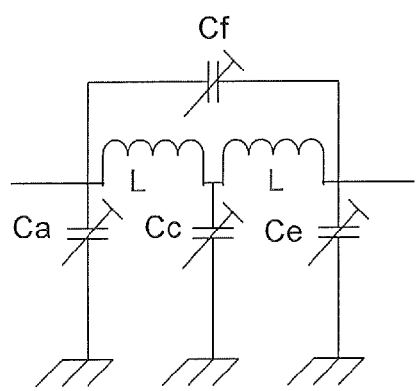
FIG. 2 is an example RF antenna tuner in accordance with some embodiments.

FIG. 2 shows an example circuit schematic of an antenna tuner circuit 200 (e.g., antenna tuner 114 in FIG. 1) in accordance with some embodiments. It will be appreciated that FIG. 2's antenna tuner circuit 200 is merely one example provided for purposes of understanding and in no way limits the scope of the present invention. The antenna tuner 200 includes first and second inductors arranged in series, wherein each inductor has first and second terminals. Adjustable capacitors can also be coupled as shown. The turning calculator (110 in FIG. 1) can change the capacitance values to "tune" the antenna tuner 200 so as to match the input impedance of the RF antenna 102 with the output impedance of the RF transmission path 104.

Figure 3:
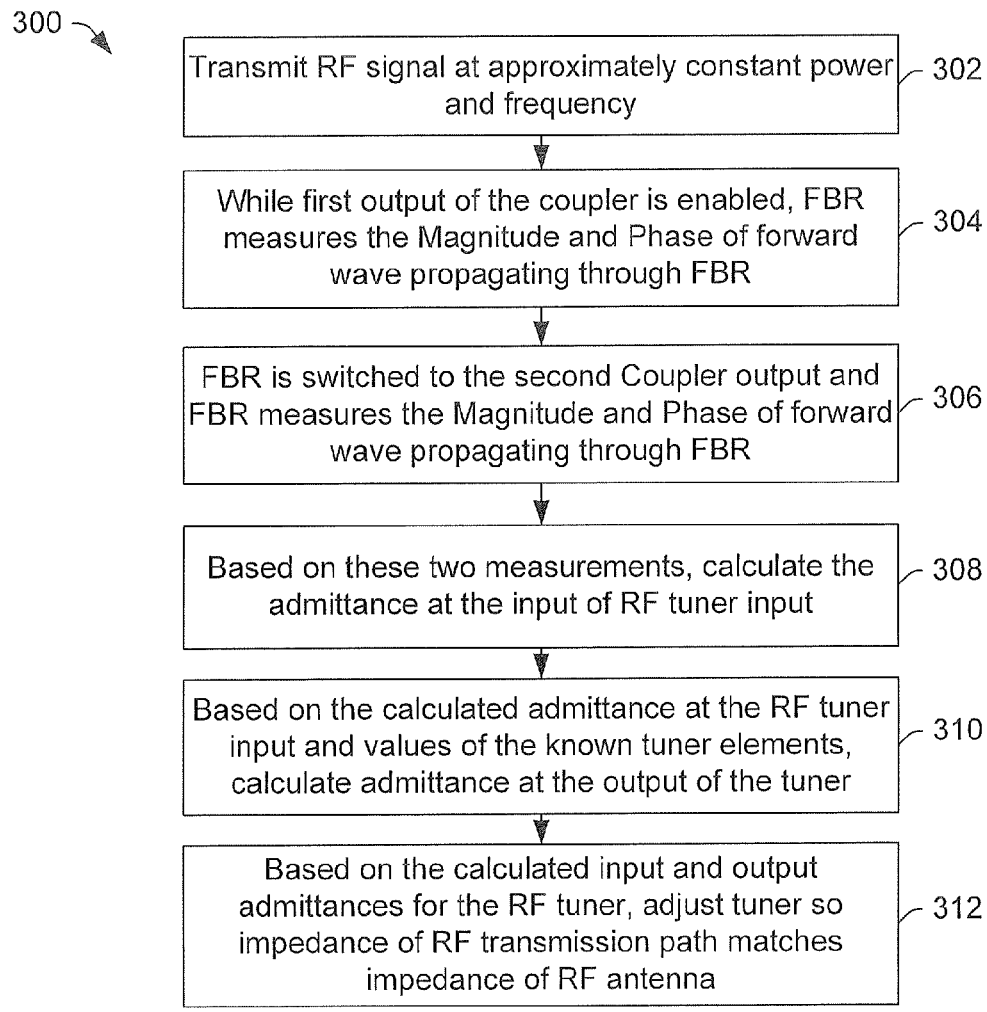
FIG. 3 is a flow diagram of a method in accordance with some embodiments.

FIG. 3 illustrates a method of operation 300, which is now discussed in conjunction with FIG. 1. While this method 300 is illustrated and described below as a series of acts or events, the present disclosure is not limited by the illustrated ordering of such acts or events. The same is true for other methods disclosed herein. For example, some acts may occur in different orders and/or concurrently with other acts or events apart from those illustrated and/or described herein. In addition, not all illustrated acts are required, and one or more of the acts depicted herein may be carried out in one or more separate acts or phases.

The method 300 starts at 302, wherein after a normal ramp-up procedure is finished, the transmitter transmits an RF signal having approximately constant power at an approximately constant frequency. With regard to FIG. 1, this transmission is from the transmission path 104, through the tuner 114, and out the RF antenna 102. At 304, while a first output of the directional coupler 106 is enabled, the tuning calculator 110 measures the magnitude and phase of a forward propagating wave through the FBR 108. At 306, a second output of the directional coupler 106 is enabled, and the tuning calculator 110 measures the magnitude and phase of a reflected wave through the FBR 108. At 308, based on these two measurements, the tuning calculator 110 calculates the admittance at the output of the directional coupler 106, which is equal to the admittance at the input of the antenna tuner 114. At 310, based on the tuner input admittance and the tuner's known structure (see e.g., FIG. 2), the tuning calculator 110 calculates the admittance at the tuner output, which is equal to the admittance at RF antenna input. At 312, the method adjusts the tuner so the impedance of the RF transmission path matches the impedance of the RF antenna. In many embodiments, the impedance adjustment is made at a symbol boundary between two time slots to prevent the adjustment from corrupting the transmitted signal. In this way, a present antenna tuner setting is assumed to be valid until the transmission frequency is changed or until impedance mismatching exceeds a predetermined threshold. To check matching, measurements can be repeated from time to time even if the transmission frequency is constant. In some embodiments, calculations and antenna tuner updating can be performed only when a change in transmission frequency occurs or when high amounts of impedance mismatch occur.

Figure 4:
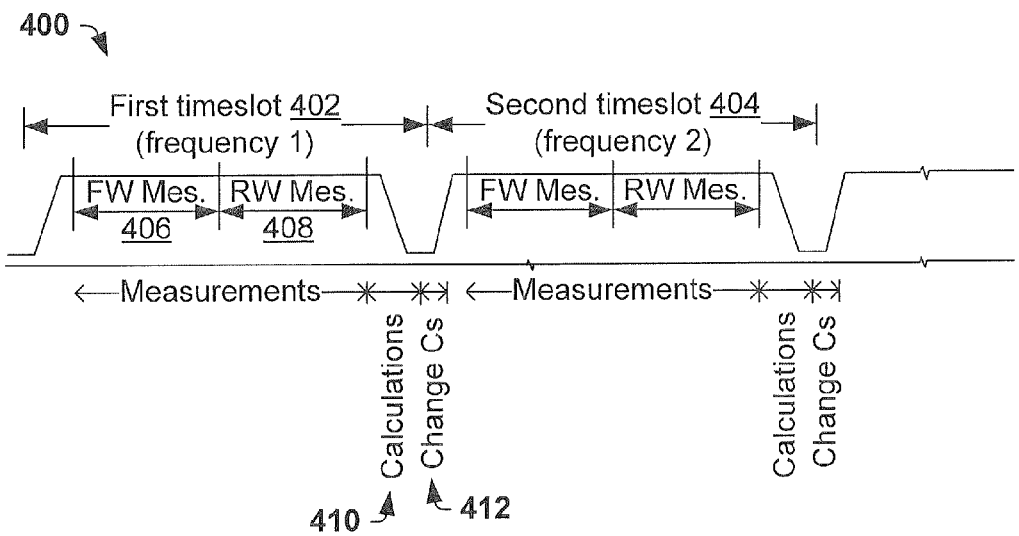
FIG. 4 is an example timing diagram in accordance with some embodiments.

FIG. 4 shows an example waveform illustrating how the forward wave and reflected waves can be measured in time to adjust an RF antenna tuner (e.g., 114 in FIG. 1). In particular, FIG. 4 shows two timeslots, which can be assigned to the transmitter via a base station or other wireless communication device. In FIG. 4's example, the transmitter transmits over a first frequency band during a first timeslot 402 and transmits over a second, different frequency band during a second timeslot 404. To limit impedance mismatch in the first timeslot 402, during a first time period 406 the transmitter sets its directional coupler (e.g., 106 in FIG. 6) to propagate a forward wave through the transmitter's FBR and correspondingly measures the power propagating through the directional coupler. Subsequently, during a second time period 408, the transmitter sets its directional coupler to reflect a wave from the transmitters FBR and measures a corresponding power in the FBR. Based on these measurements, at time 410 the transmitter calculates a change in impedance that will limit impedance mismatch between the RF transmission path and the RF antenna for the first timeslot. Subsequently, at 412 the transmitter implements the change and thereafter transmits data in accordance with the adjusted impedance for the second timeslot 404. Similar functionality is shown for the second timeslot 404.

Although FIG. 4 shows the first and second timeslots as having different frequencies, it will be appreciated that in other embodiments the first and second timeslots could transmit over the same frequency and the measurements could take into account different use cases for the first and second timeslots. For example, the first timeslot could measure a use case where a user's hand is on the phone, and the second timeslot could measure a use case when the user's hand is off the phone, such that a change in impedance matching occurs with respect to the two timeslots. Note that the FW and RW measurements need not occur in the same timeslot as shown, but can in some instances occur in different timeslots. For example, if it is expected to transmit over the same frequency channel for a number of consecutive timeslots, the FW and RW measurements could occur in different timeslots within the consecutive timeslots. However, it is generally advantageous to take the FW and RW measurements quickly after a frequency change is made so that accurate matching can be quickly employed to limit impedance mismatch.

Figure 5:
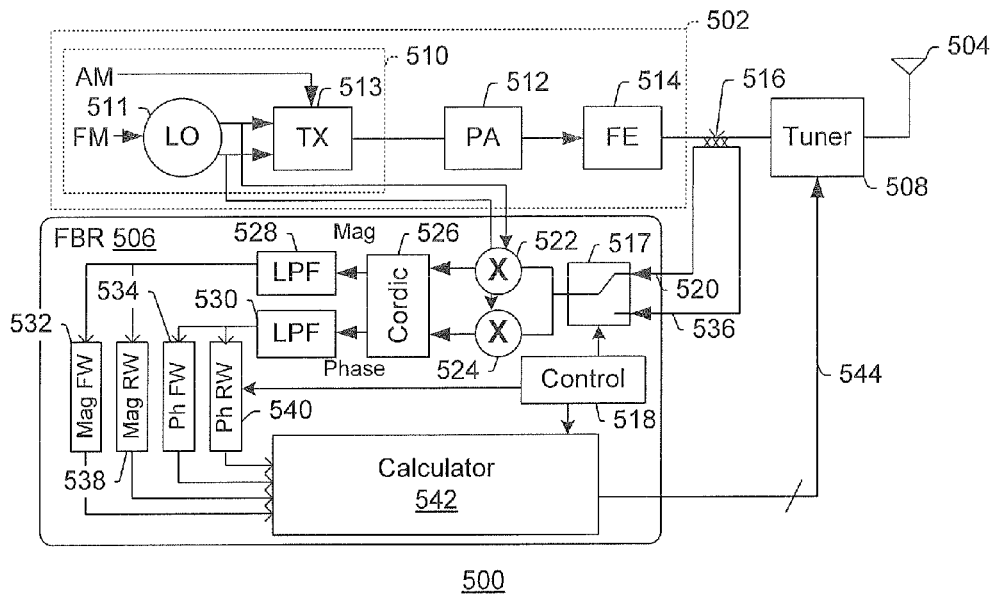
FIG. 5 is a block diagram of a transmitter that includes a polar modulator in accordance with some embodiments.

FIG. 5 shows a transmitter 500 that makes use of a polar modulator in accordance with some embodiments. Like the transmitter of FIG. 1, FIG. 5's transmitter 500 includes a transmission path 502, an RF antenna 504, a feedback receiver 506, and an RF antenna tuner 508. In this embodiment, the transmitter's transmission path 502 includes a modulator 510, a power amplifier 512, and an analog front end 514, which are operably coupled as shown. The modulator 510 includes a local oscillator (LO) 511 and a polar modulator 513, which outputs an RF signal to the power amplifier 512 based on an amplitude modulation (AM) signal and a frequency modulation (FM) signal.

To limit the impedance mismatch between the analog front end 514 and the RF antenna 504, a directional coupler 516 is coupled to a switch 517. The switch 517, under the direction of a controller 518, provides forward propagating and reflected waves from the directional coupler 516 for a given timeslot to the FBR. When the controller 518 enables a first output 520 of the coupler 516 during the timeslot, the forward propagating wave from the coupler 516 passes through first and second mixers (522, 524) and to a cordic 526, which outputs separate phase and magnitude information. Low-pass filters (LPF) (528, 530) filter the phase and magnitude signals, and registers (532, 534) store phase and amplitude/magnitude information for the forward propagating wave for the timeslot. The controller 518 subsequently enables a second output 536 of the coupler 516, and registers 538, 540 thereafter record the phase and magnitude information relating to the reflected wave for the given timeslot. Based on the phase and magnitude values for the forward-propagating and reflected waves stored in the registers (532, 534, 538, 540), a calculator 542 (which is often implemented in software running on a microprocessor) provides a tuning signal on the feedback path 544. This tuning signal adjusts the impedance of the antenna tuner 508 to limit any impedance mismatch between the analog front end 514 and the antenna 504 for the timeslot and/or for subsequent timeslots using the same transmission frequency.

Figure 6:
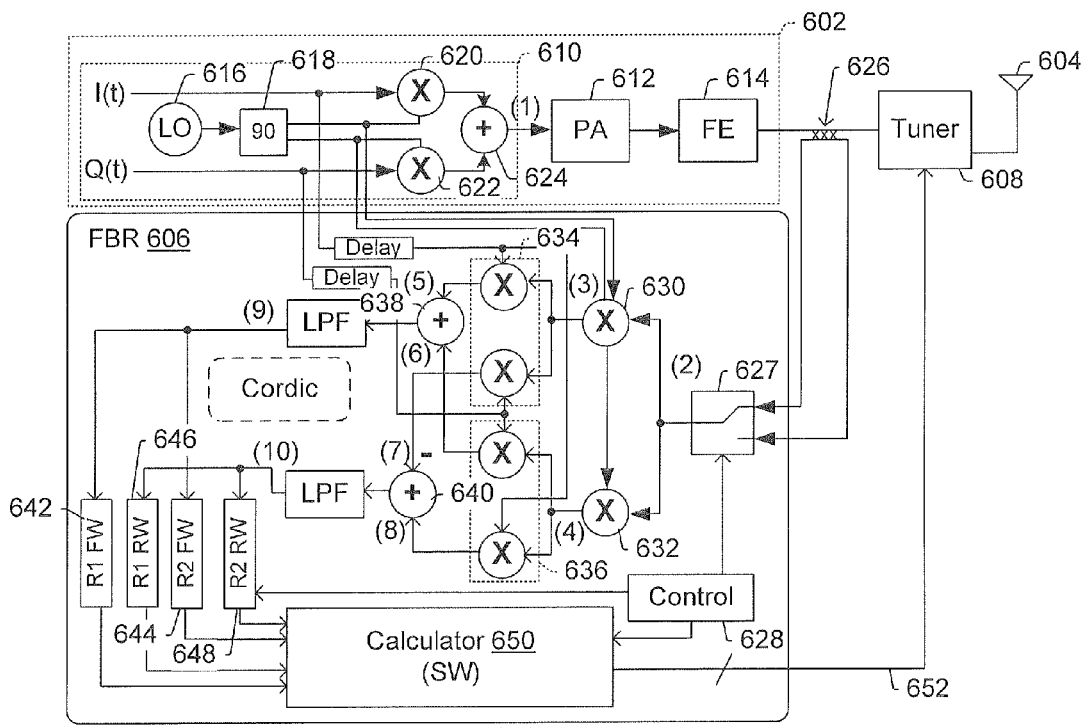
FIG. 6 is a block diagram of a transmitter that includes an IQ modulator in accordance with some embodiments.

FIG. 6 shows a transmitter 600 that makes use of an IQ modulator in accordance with some embodiments. Like the transmitter of FIG. 5, FIG. 6's transmitter 600 includes a transmission path 602, an RF antenna 604, a feedback receiver 606, and an RF antenna tuner 608. In this embodiment, the transmitter's transmission path 602 includes an IQ modulator 610, a power amplifier 612, and an analog front end 614, which are operably coupled as shown. The IQ modulator 610 includes a local oscillator 616, a 90° phase shift module 618, first and second frequency converters (e.g., mixers—620, 622) and a summation element 624. These components receive I and Q data streams, and process them to provide an IQ modulated RF stream to the power amplifier 614.

To limit the impedance mismatch between the analog front end 614 and the RF antenna 604, a directional coupler 626 is coupled to a switch 627. The switch 627, under the direction of a controller 628 measures forward propagating and reflected waves from the directional coupler 626 for a given timeslot with regard to the FBR. When the controller 628 passes a first output of the coupler 626 to the FBR during the timeslot, the forward propagating wave from the coupler 626 passes through first mixer and second mixers 630, 632, and then a first pair of mixers 634 and a second pair of mixers 636. One of the mixers of each of the first and second pairs of mixers are coupled to a first summation element 638, and the other of the mixers of each of the first and second pairs of mixers are coupled to a second summation element 640. The first and second summation elements are coupled to registers 642, 644, which store values relating to the forward propagating wave therein. The controller subsequently changes the switch 627 so a second output of the coupler 626 is passed to the FBR, and a reflected wave propagates through the mixers and summation elements, until being stored in registers 646, 648. Based on the values stored in the registers (642-648), the calculator 650 (which is often implemented in software running on a microprocessor) provides a tuning signal on the feedback path 652. This tuning signal adjusts the impedance of the antenna tuner 608 to limit any impedance mismatch between the analog front end 614 and the antenna 604 for the timeslot and/or for subsequent timeslots.

Below is a more detailed description of how this process can be carried out with regards to FIG. 6's implementation. We start with the expressions:

$Y\_re\_tun = \frac{1}{50} * (1 + Mag\_rel * COS(Del\_Ph))$ $Y\_im\_tun = \frac{1}{50} * Mag\_rel * SIN(Del\_Ph)$, where Mag_rel=relation between two Magnitudes, and Del_Ph=difference between two phases. The complex admittance at the tuner output can be described as a function of Antenna admittance, current frequency (W) and Tuner element settings:

$$Y\_re\_tun + j * Y\_im\_tun = \quad (1)$$
$$F1(w, Ca, Cc, Ce, L, Y\_re\_ant, Y\_im\_ant) +$$
$$j * F2(w, Ca, Cc, Ce, L, Y\_re\_ant, Y\_im\_ant)$$

In the same way the complex admittance at antenna output can be described as a function of Tuner output admittance, current frequency (W) and Tuner settings:

$$Y\_re\_ant + j * Y\_im\_ant = \quad (2)$$
$$F3(w, Ca, Cc, Ce, L, Y\_re\_tun, Y\_im\_tun) +$$
$$j * F4(w, Ca, Cc, Ce, L, Y\_re\_tun, Y\_im\_tun)$$

Because the current antenna admittance and the tuner's internal structure is known, the transmitter can calculate the new values for the tuner's elements to match the current antenna admittance to the wanted impedance (e.g., 50 Ohm).

$$F5(w,Ca,Cc,L,Y\_re\_ant,Y\_im\_ant)=\tfrac{1}{50} \quad (3)$$

$$F6(w,Ca,Cc,Ce,L,Y\_re\_ant,Y\_im\_ant)=0 \quad (4)$$

The values of Mag_rel*COS(Del_Ph) and Mag_rel*SIN(Del_Ph) for PM transmitter are calculated automatically because of the working principle of FBR using modulated LO. To calculate the Mag_rel*COS(Del_Ph) and Mag_rel*SIN(Del_Ph) for the IQ transmitter the following acts can be done.

According to the working principle of direct modulated transmission path, the Signal at point (1) on FIG. 6 could be described as:

$(1)=I(t)*SIN(Wt)+Q(t)*COS(Wt)$

After propagation delay in RF units and phase shifting in the directional coupler because of some mismatching the signal at FBR input (point 2) could be presented as:

$(2)=A*(I(t)*SIN(Wt+Ph1)+Q(t)*COS(Wt+Ph1))$, where A is the magnitude gain and Ph1 is the phase shift on the first output of directional coupler.

After multiplying signal (2) with non modulated LO and filtering out the RF components there will be two LF signals like:

$$(3) = A * (I(t) * SIN(Wt + Ph1) + Q(t) * COS(Wt + Ph1)) * SIN(Wt)$$
$$= A * I(t)/2 * COS(Ph1) - A * Q(t)/2 * SIN(Ph1)$$

$$(4) = A * (I(t) * SIN(Wt + Ph1) + Q(t) * COS(Wt + Ph1)) * COS(Wt)$$
$$= A * I(t)/2 * SIN(Ph1) + A * Q(t)/2 * COS(Ph1)$$

Signals (3) and (4) depend from current I(t) and Q(t) components, which have mean value of zero. Therefore (3) and (4) will also become zero after averaging in the baseband LPF.

To extract A and Ph1 information Signals (3) and (4) should be multiplied with original Signals I(t) and Q(t) as shown below:

$(5)=(3)*I(t)=A*I(t)^2/2*COS(Ph1)-A*I(t)*Q(t)/2*SIN(Ph1)$ $(6)=(4)*Q(t)=A*I(t)*Q(t)/2*SIN(Ph1)+A*Q(t)^2/2*COS(Ph1)$ $(7)=(3)*Q(t)=A*I(t)*Q(t)/2*COS(Ph1)-A*Q(t)^2/2*SIN(Ph1)$ $(8)=(4)*I(t)=A*I(t)^2/2*SIN(Ph1)+A*I(t)*Q(t)/2*COS(Ph1)$

On the next step Signals (5), (6), (7) and (8) should be summed in pairs:

$$(9)=(5)+(6)=A/2*\text{COS}(Ph1)*(I(t)^2+Q(t)^2)=A/2*C*\text{COS}(Ph1)$$

$$(10)=(8)-(7)=A/2*\text{SIN}(Ph1)*(I(t)^2+Q(t)^2)=A/2*C*\text{SIN}(Ph1)$$

Component $(I(t)^2+Q(t)^2)$ is a current magnitude of an input signal and could be seen as a constant C after averaging over long period of time.

Values (9) and (10) are stored into Registers R1_FW and R2_FW. FBR is then switched to Reflected Wave output of directional coupler and the whole procedure is repeated again. This time values (9) and (10) are stored into Registers R1_RW and R2_RW, as follows:

$$R1\_FW=A/2*C*\text{COS}(Ph1)$$

$$R1\_RW=B/2*C*\text{COS}(Ph2)$$

$$R2\_FW=A/2*C*\text{SIN}(Ph1)$$

$$R2\_RW=B/2*C*\text{SIN}(Ph2)$$

Where: A and B are respectively the Magnitude Gains of Forwarded and Reflected Waves, and Ph1 and Ph2 are the Phase Shifts of Forwarded and Reflected Waves.

Using Values stored in Registers R1_FW, R2_FW, R1_RW and R2_RW the SW Calculator could extract the Mag_rel*COS(Del_Ph) and Mag_rel*SIN(Del_Ph) as following:

$$\frac{R1\_RW*R2\_FW - R2\_RW*R1\_FW}{R1\_FW*R1\_FW + R2\_FW*R2\_FW} = \frac{B}{A}*\text{SIN}(Ph2-Ph1)$$

$$\frac{R2\_RW*R2\_FW + R1\_RW*R1\_FW}{R1\_FW*R1\_FW + R2\_FW*R2\_FW} = \frac{B}{A}*\text{COS}(Ph2-Ph1)$$

Having these values the calculator can do all necessary calculations described above to find the new Tuner settings for the best possible matching between PA and Antenna.

Although the disclosure has been shown and described with respect to one or more implementations, equivalent alterations and modifications will occur to others skilled in the art based upon a reading and understanding of this specification and the annexed drawings. For example, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A transmitter, comprising:
a transmission path configured to provide a radio frequency (RF) signal to an RF antenna, the transmission path comprising a polar modulator;
analysis circuitry coupled between the transmission path and the RF antenna, wherein the analysis circuitry is configured to determine an impedance mismatch between the transmission path and the RF antenna;
an antenna tuner coupled between the analysis circuitry and the RF antenna; and
a feedback path coupling the analysis circuitry to the antenna tuner, wherein the feedback path is configured to carry a feedback signal from the analysis circuitry to the antenna tuner to reduce the determined impedance mismatch;
wherein the analysis circuitry comprises:
a directional coupler coupled between the polar modulator and the antenna tuner;
first and second mixers having respective first inputs coupled to an output of the directional coupler and having respective second inputs to receive a local oscillator (LO) signal;
a cordic coupled to the first and second mixers and configured to output magnitude and phase information based on outputs of the first and second mixers; and
memory elements configured to store the magnitude and phase information from the cordic.

2. The transmitter of claim 1, wherein the analysis circuitry comprises:
a measurement unit configured to measure a phase and magnitude of a forward directed wave from the directional coupler, and further configured to measure a phase and magnitude of a reflected wave from the directional coupler.

3. The transmitter of claim 2, further comprising:
a calculation module to provide the feedback signal on the feedback path to tune the antenna tuner; wherein the feedback signal is based on the phase and magnitude of the forward directed wave as well as the phase and magnitude of the reflected wave.

4. The transmitter of claim 1, wherein the antenna tuner comprises at least one adjustable capacitor whose capacitance is adjusted based on the feedback signal.

5. The transmitter of claim 1, wherein
the polar modulator has an input and output; and wherein the transmission path further comprises:
a power amplifier having an input and output, wherein the input of the power amplifier is coupled to the output of the modulator; and
an analog front end having an input and an output, wherein the input of the analog front end is coupled to the output of the power amplifier and wherein the output of the analog front end is coupled to the antenna tuner.

6. A method, comprising:
transmitting a radio frequency (RF) signal at an at least approximately constant power over a first frequency channel via an antenna;
while the RF signal is transmitted, setting a directional coupler to provide a forward directed wave through a feedback receiver and measuring a phase and magnitude of the forward directed wave;

while the RF signal is transmitted, setting the directional coupler to provide a reflected wave through the feedback receiver and measuring a phase and magnitude of the reflected wave;

based on the measured phases and magnitudes for the forward directed and reflected waves, adjusting an admittance of an antenna tuner to set a matching condition between the antenna tuner and the RF antenna while the first frequency channel is employed;

where the admittance of the antenna tuner is adjusted at a symbol boundary between two consecutive timeslots.

7. The method of claim 6, wherein the first time and second time are both included in a single transmission timeslot assigned by a basestation.

8. A transmitter, comprising:

a transmission path configured to provide a radio frequency (RF) signal to an RF antenna, the transmission path comprising an IQ modulator;

analysis circuitry coupled between the transmission path and the RF antenna, wherein the analysis circuitry is configured to determine an impedance mismatch between the transmission path and the RF antenna;

an antenna tuner coupled between the analysis circuitry and the RF antenna; and a feedback path coupling the analysis circuitry to the antenna tuner, wherein the feedback path is configured to carry a feedback signal from the analysis circuitry to the antenna tuner to reduce the determined impedance mismatch;

wherein the analysis circuitry comprises:

a directional coupler coupled between the IQ modulator and the antenna tuner;

first and second mixers having respective first inputs coupled to an output of the directional coupler and having respective second inputs to receive a local oscillator (LO) signal;

a first pair of mixers downstream of the first mixer and coupled thereto;

a second pair of mixers downstream of the second mixer and coupled thereto;

a first summation element coupled to one of each of the first pair and second pair of mixers to measure a forward directed wave from the directional coupler; and a second summation element coupled to the other of each of the first pair and second pair of mixers to measure a reflected wave from the directional coupler.

9. The transmitter of claim 8, wherein the IQ modulator has an input and output; and wherein the transmission path further comprises:

a power amplifier having an input and output, wherein the input of the power amplifier is coupled to the output of the IQ modulator; and an analog front end having an input and an output, wherein the input of the analog front end is coupled to the output of the power amplifier and wherein the output of the analog front end is coupled to the antenna tuner.

10. A method, comprising:

transmitting a radio frequency (RF) signal at an at least approximately constant power over a first frequency channel via an antenna;

while the RF signal is transmitted at a first time, setting a directional coupler to provide a forward directed wave through a feedback receiver and measuring a phase and magnitude of the forward directed wave;

while the RF signal is transmitted at a second time, setting the directional coupler to provide a reflected wave through the feedback receiver and measuring a phase and magnitude of the reflected wave;

based on the measured phases and magnitudes for the forward directed and reflected waves, adjusting an admittance of an antenna tuner to set a matching condition between the antenna tuner and the RF antenna while the first frequency channel is employed;

wherein the first time and second time are both included in different respective transmission timeslots as assigned by a basestation.

* * * * *